United States Patent
Cai et al.

(10) Patent No.: US 9,438,746 B2
(45) Date of Patent: Sep. 6, 2016

(54) CENTRALIZED CHARGING SYSTEMS FOR OFFLINE CHARGING AND ONLINE CHARGING

(75) Inventors: Yigang Cai, Naperville, IL (US); Xiangyang Li, Beijing (CN)

(73) Assignee: Alcatel Lucent, Boulogne-Billancourt (FR)

( * ) Notice: Subject to any disclaimer, the term of this patent is extended or adjusted under 35 U.S.C. 154(b) by 1083 days.

(21) Appl. No.: 12/988,184

(22) PCT Filed: May 1, 2008

(86) PCT No.: PCT/US2008/062269
§ 371 (c)(1),
(2), (4) Date: Oct. 15, 2010

(87) PCT Pub. No.: WO2009/134267
PCT Pub. Date: Nov. 5, 2009

(65) Prior Publication Data
US 2011/0040663 A1 Feb. 17, 2011

(51) Int. Cl.
*H04M 15/00* (2006.01)
*H04L 12/14* (2006.01)
(Continued)

(52) U.S. Cl.
CPC ............ *H04M 15/00* (2013.01); *G06Q 40/12* (2013.12); *H04L 12/14* (2013.01);
(Continued)

(58) Field of Classification Search
CPC .. H04M 15/00; H04M 17/00; H04M 15/765; H04M 15/772; H04M 15/44; H04M 15/77; H04M 2215/7263; H04M 2215/0104; G06Q 40/12; H04L 12/14; H04L 12/1457; H04L 12/1403; H04L 12/1467; H04W 4/24
See application file for complete search history.

(56) References Cited

U.S. PATENT DOCUMENTS

2007/0103117 A1* 5/2007 Burghardt .................... 320/119
2007/0173226 A1    7/2007 Cai et al.

FOREIGN PATENT DOCUMENTS

WO    WO2007120598 A    10/2007

OTHER PUBLICATIONS

3GPP,"3rd Generation Partnership Project; Technical Specification Group Services and System Aspects; Telecommunication management; Charging architecture and principles (Release 8); 3GPP TS 32.240 Version 8.1.0" 3GPP Technical Specification, Sophia Antipolis, France, [Online} vol. 32.240, No. v8.1.0, Dec. 1, 2007, p. 1-41, XP002504773 Retrieved from the Internet: URL:http//www.3gpp.org/ftp/Specs/2007-12/Rel-8/32_series/32240-810.zip>[retrieved on Nov. 20, 2008] cited in the application p. 15, line 1-pge 34, line 10.

*Primary Examiner* — Hajime Rojas
(74) *Attorney, Agent, or Firm* — Dult Bornsen & Fettig, LLP

(57) ABSTRACT

Centralized charging systems and methods are disclosed for providing offline charging and online charging for a plurality of network elements. The centralized charging system is implemented in a communication network between the network elements and offline/online charging systems. A network element interface of the centralized charging system receives charging request messages from CTFs in the network elements. An accounting data forwarding function processes charging data in the charging request messages to determine if offline or online charging is invoked for the services. For offline charging, the accounting data forwarding function generates offline accounting request messages that include the charging data. For online charging, the accounting data forwarding function generates online accounting request messages that include the charging data. The charging system interface then transmits the offline accounting request messages to the offline charging system, and transmits the online accounting request messages to the online charging system.

20 Claims, 6 Drawing Sheets

(51) Int. Cl.
  *H04M 17/00* (2006.01)
  *H04W 4/24* (2009.01)
  *G06Q 40/00* (2012.01)
(52) U.S. Cl.
  CPC ...... *H04L 12/1403* (2013.01); *H04L 12/1457* (2013.01); *H04L 12/1467* (2013.01); *H04M 15/44* (2013.01); *H04M 15/765* (2013.01); *H04M 15/77* (2013.01); *H04M 15/772* (2013.01); *H04M 17/00* (2013.01); *H04W 4/24* (2013.01); *H04M 2215/0104* (2013.01); *H04M 2215/204* (2013.01); *H04M 2215/724* (2013.01); *H04M 2215/7254* (2013.01); *H04M 2215/7263* (2013.01)

CENTRALIZED CHARGING SYSTEMS FOR OFFLINE CHARGING AND ONLINE CHARGING

BACKGROUND OF THE INVENTION

1. Field of the Invention

The invention is related to the field of charging in communication networks, and in particular, to a centralized charging system for offline charging and online charging in communication networks, such as 3GPP/3GPP2 networks.

2. Statement of the Problem

Service providers typically provide numerous voice and/or data services to subscribers using one or more wireline and/or wireless communication networks. Exemplary services include cellular telephony, access to the Internet, gaining, broadcasting or multicasting of audio, video, and multimedia programming, etc. Mobile devices, such as cell phones, personal data assistants, smart phones, pagers, text messaging devices, global positioning system (GPS) devices, network interface cards, notebook computers, and desktop computers, may access the services provided by the communication networks over an air interface with one or more base stations. Communication between the mobile devices and base stations are governed by various standards and/or protocols, such as the standards and protocols defined by the 3rd Generation Partnership Project (3GPP, 3GPP2).

The service providers use offline and online billing functions to keep track of the charges incurred by each device for using the various services. The 3GPP/3GPP2 standards groups have defined a set of specifications that may be used to implement online charging systems and offline charging systems to cover charging in the various network domains (e.g., a circuit switching network domain, a packet switching network domain, and/or a wireless domain), IP multimedia subsystems, and emerging 3G/OMA application services.

Online charging is generally defined as a charging mechanism where charging information can affect, in real-time, the service rendered, and therefore a direct interaction of the charging mechanism with session/service control is needed. In online charging, charging information for network resource usage is collected concurrently with the resource usage. However, authorization for the network resource usage must be obtained by the network prior to the actual resource usage. The network elements in a communication network, such as a Call Session Control Function (Proxy, Serving, Interrogate) or an application server (AS) in an IMS network, include Charging Trigger Functions (CTF). For online charging, the CTF triggers on charging events, collects charging information pertaining to the charging events, and assembles the charging information into matching charging events. The CTF then transmits accounting messages to the Online Charging System (OCS) in order to obtain authorization for the charging event/network resource usage requested by the user. The CTF delays the actual resource usage until permission has been granted by the OCS. When a granted quota of service units is obtained from the OCS, the CTF performs budget control during the resource usage. The CTF enforces termination of the end user's resource usage when permission by the OCS is not granted or expires.

Offline charging is generally defined as a charging mechanism where charging information does not affect, in real-time, the service rendered. In offline charging, charging information for network resource usage is collected concurrently with resource usage. The CTF triggers on charging events, collects charging information pertaining to the charging events, and assembles the charging information into matching charging events. The CTF then transmits accounting messages to a Charging Data Function (CDF).

According to the present 3GPP specifications (TS 32.240), the CTF imbedded in each network element includes two parts. One part of the CTF is the accounting metrics collection function. The accounting metrics collection function provides metrics that identify the user and the user's consumption of network resources and/or services in real-time. The accounting metrics collection function is considered dependent on the network element. From the charging mechanism perspective, online charging and offline charging have the same collection function, and are transparent to the accounting metrics collection function. Thus, the accounting metrics collection function is considered as charging mechanism independent.

Another part of the CTF is the accounting data forwarding function. The charging information received by the accounting data forwarding function from the accounting metrics collection function, and the relevant charging events, are specific to each type of network element. The overall functionality of receiving, assembling, and forwarding the charging information may be considered generic. Thus, the accounting data forwarding function is considered the independent from the network element.

According to the present 3GPP specifications, the CTF is a mandatory, integrated component in all network elements that provide online/offline charging functionality. This means that each network/subsystem/service element will have its own CTF to implement both the accounting metrics collection function and the accounting data forwarding function in its CTF. One problem with the present offline/online charging mechanisms is that when a network operator wants to enhance the accounting data forwarding functionality, each network element will need to be upgraded (software modification and upgrade). These upgrades can be time consuming and complex, especially in communication networks having a significant number of network elements.

Further, when an accounting data forwarding function is implemented in the CTF of each network element, the network element needs to maintain a charging mechanism profile for each user, and needs to have different data forwarding treatment for online charging and offline charging. Because the specific call treatment for offline charging and online charging are different, the accounting data forwarding function may overload the network element. Thus, many service providers opt to implement offline charging data forwarding, but do not implement advanced online charging accounting data forwarding with budget control. These service providers are unfortunately missing out on the services and revenue generated from online charging.

SUMMARY OF THE SOLUTION

Embodiments of the invention solve the above and other related problems by centralizing the accounting data forwarding function in a centralized charging system for multiple network elements. Thus, the CTFs in the network elements do not need the accounting data forwarding function, which is independent of the network element. The CTFs in the network elements may still include the accounting metrics collection function, which is network element dependent, but the accounting data forwarding function may be moved to the centralized charging system, which can service multiple network elements. Thus, if a network operator wants to enhance the accounting data forwarding function, the network operator may upgrade the accounting data forwarding function in the centralized charging system as opposed to upgrading each individual network element. Also, the accounting data forwarding function in the centralized charging system is used for both offline charging functions and online charging functions. Thus, service providers can more quickly and easily add online charging with less of a concern of overloading the network elements.

One embodiment of the invention comprises a centralized charging system implemented between a plurality of network elements and offline/online charging systems. The centralized charging system includes a network element interface operable to receive charging request messages from Charging Trigger Functions (CTF) in the network elements. The charging request messages include charging data for services triggered in the network elements. The centralized charging system further includes an accounting data forwarding function operable to process the charging data in the charging request messages received from the CTFs to determine if offline charging or online charging is invoked for the services. For the services that invoke offline charging, the accounting data forwarding function is further operable to generate offline accounting request messages that include the charging data. For the services that invoke online charging, the accounting data forwarding function is further operable to generate online accounting request messages that include the charging data. The centralized charging system further includes a charging system interface operable to transmit the offline accounting request messages to the offline charging system, and to transmit the online accounting request messages to the online charging system.

In another embodiment, the centralized charging system may further include a budget control system operable to receive quotas of service units granted by the online charging system, and to monitor usage of the quotas of service units in providing the services in the network elements.

In another embodiment, the centralized charging system may further include a charging index database operable to store charging profiles for users of the communication network. The charging index database is operable to receive a query from the accounting data forwarding function for a charging profile of a user having requested a service, to identify the charging profile for the user indicating whether the service triggered for the user invokes offline charging or online charging, and to transmit the charging profile to the accounting data forwarding function.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-7 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
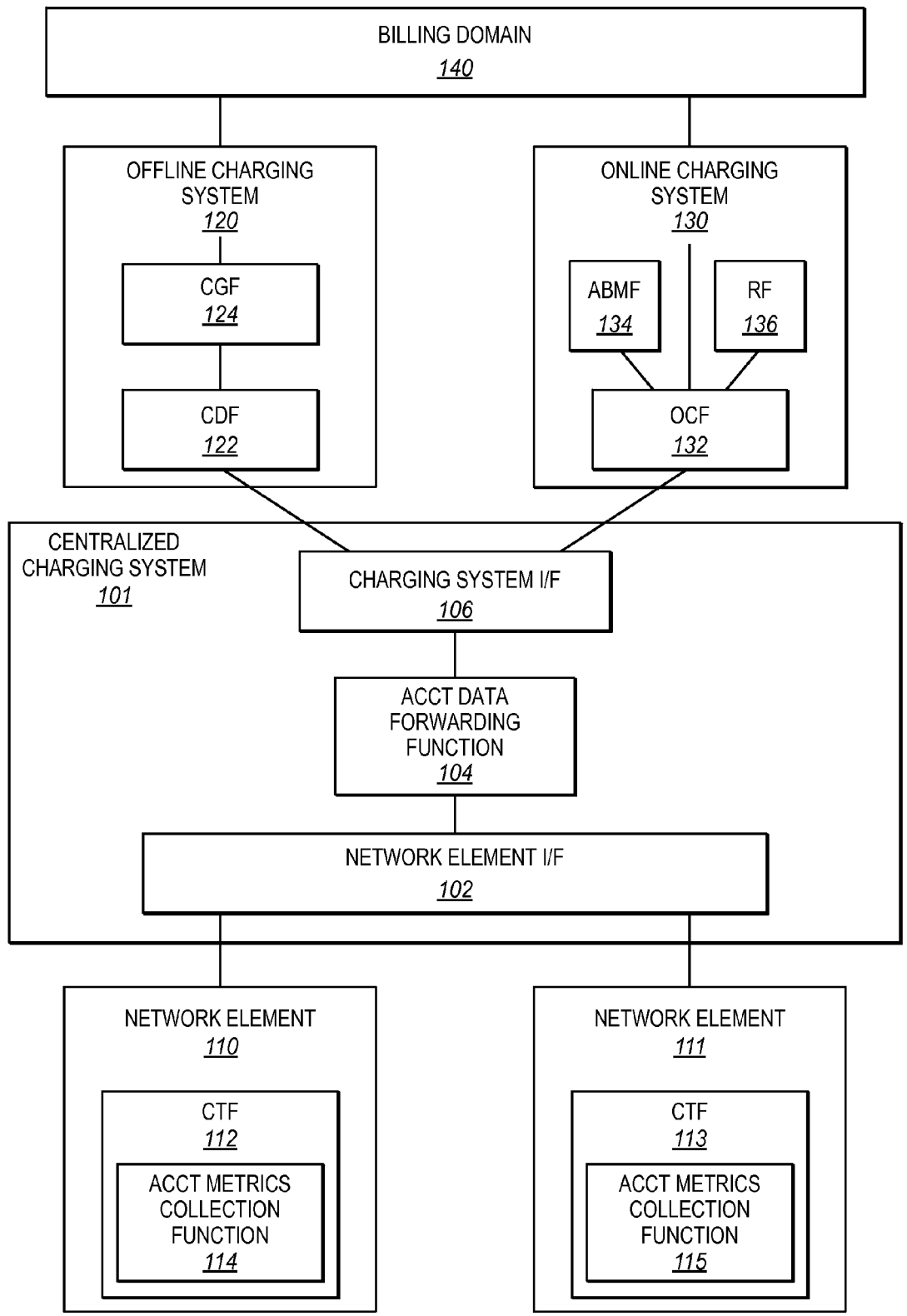
FIG. 1 illustrates a communication network in an exemplary embodiment of the invention.

FIG. 1 illustrates a communication network 100 in an exemplary embodiment of the invention. Communication network 100 includes a plurality of network elements 110-111. A network element comprises any system, server, or function operable to provide services for voice and/or data sessions in communication network 100. Network elements 110-111 may be from a variety of network domains, such as a circuit-switched domain (e.g., a PSTN network, a GSM network, a CDMA network, etc), a packet-switched domain (e.g., UMTS/GPRS networks, CDMA 2000 network, TD-SCDMA network, etc), an IMS network, etc. Some examples of a network element 110-111 in an IMS network are a call session control function (Proxy, Serving, Interrogate), an application server (AS), a media gateway control function (MGCF), a break-out gateway control function (BGCF), etc. Some examples of a network element 110-111 in a circuit-switched domain are a switch, a Mobile Switching Center (MSC), etc.

Network elements 110-111 include a Charging Trigger Function (CTF) 112-113, respectively. CTFs 112-113 include an accounting metrics collection function 114-115, respectively. Although each CTF 112-113 includes the accounting metrics collection function 114-115, the CTFs 112-113 do not need to also include an accounting data forwarding function as suggested by the 3GPP/3GPP2 specifications. Instead, the accounting data forwarding function is consolidated in a centralized charging system 101 as described below.

Communication network 100 further includes centralized charging system 101 that is accessible to network elements 110-111. Centralized charging system 101 is implemented between network elements 110-111 and the charging systems (offline charging system 120 and online charging system 130) in the charging architecture. Centralized charging system 101 includes a network element interface 102, an accounting data forwarding function 104, and a charging system interface 106. Network element interface 102 comprises any system, server, or function operable to exchange messages with network elements 110-111 in the protocol used by network elements 110-111, and convert the messages to a protocol used by account data forwarding function 104. For example, network elements 110-111 may use CS1, CAP1/2/3, IS-826, IS835-C, Diameter, RADIUS, XML, LDAP, SOAP, TCP/IP, SIP, CORBA, LDAP, or other protocols for communication.

Accounting data forwarding function 104 comprises any system, server, or function operable to determine the type of charging (offline or online) invoked for a service, to generate offline accounting request messages for the services that invoke offline charging, and to generate online accounting request messages for the services that invoke online charging. Accounting data forwarding function 104 may perform the functions specified in the 3GPP/3GPP2 specifications, and additional functions as described herein. Charging system interface 106 comprises any system, server, or function operable to exchange messages with offline charging system 120 and online charging system 130 in the protocol used by the charging systems. For example, charging system interface 106 may communicate with offline charging system 120 via the Diameter Rf interface, and may communicate with online charging system 130 via the Diameter Ro interface.

Communication network 100 also includes an offline charging system 120, an online charging system (OCS) 130, and billing domain 140. Offline charging system 120 comprises any system, server, or function operable to provide offline charging for a session. In this embodiment, offline charging system 120 includes a Charging Data Function (CDF) 122 and a Charging Gateway Function (CGF) 124. In other embodiments, offline charging system 120 may comprise other types of charging functions, such as a Charging Collector Function (CCF).

OCS 130 comprises any system, server, or function operable to provide online charging for a session. In this embodiment, OCS 130 includes an online charging function (OCF) 132, an Account Balance Management Function (ABMF) 134, and a rating function (RF) 136. OCF 132 comprises any system, server, or function operable to manage online charging in OCS 130 by accessing ABMF 134 and RF 136. ABMF 134 comprises any system, server, or function operable to maintain accounts for users, and more particularly to maintain an amount of service units in the accounts of the users. RF 136 comprises any system, server, or function operable to determine the cost of service usage according to a tariff defined by the network operator.

When in operation, network element 110 provides a service during the session of a user. When providing the service, CTF 112 triggers on one or more charging events detected during the session. Accounting metrics collection function 114 collects charging data (i.e., accounting metrics) for the session, and transmits the charging data to centralized charging system 101 in a charging request message.

Similarly, network element 111 provides another service during the session of the same or another user. When providing the service, CTF 113 triggers on one or more charging events detected during the session. Accounting metrics collection function 115 collects charging data for the session, and transmits the charging data to centralized charging system 101 in a charging request message.

Other network elements (not shown) may operate in a similar way to provide services for sessions. The CTF in each network element includes an accounting metrics collection function that collects the charging data for the service, and reports the charging data to centralized charging system 101. Centralized charging system 101 has consolidated the accounting data forwarding function 104 into a node that is accessible to network element 110, network element 111, and/or other network elements. Thus, when charging events are detected, CTFs 112-113 in the network elements 110-111 communicate with centralized charging system 101 to handling the data forwarding functionality, as described below.

Figure 2:
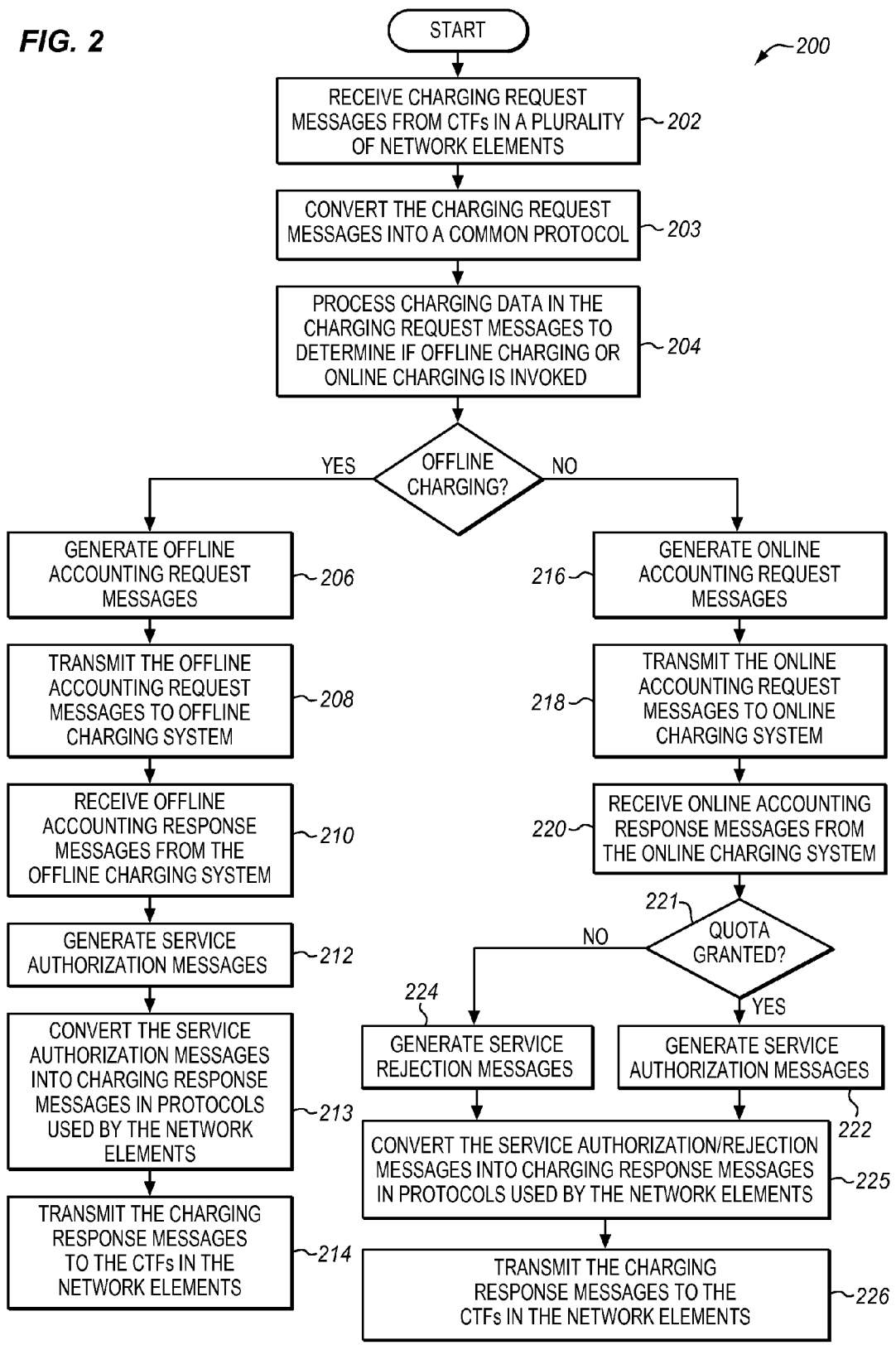
FIG. 2 is a flow chart illustrating a method of providing data forwarding for offline charging and/or online charging in an exemplary embodiment of the invention.

FIG. 2 is a flow chart illustrating a method 200 of providing data forwarding for offline charging and/or online charging in an exemplary embodiment of the invention. The steps of method 200 will be described with reference to communication network 100 in FIG. 1, although the method may be performed by other types of communication networks. The steps of the flow chart in FIG. 2 are not all inclusive and may include other steps not shown.

In step 202, network element interface 102 receives charging request messages from CTFs 112-113 in network elements 110-111, and also from other network elements not shown in FIG. 1. The charging request messages include charging data (i.e., accounting metrics collected from accounting metrics collection functions in the network elements) for services triggered in network elements 110-111. The charging request message may be in a variety of protocols depending on the protocol used by the network element 110-111. In step 203, network element interface 102 converts the charging request messages from protocols used by network elements 110-111 into a common protocol. For example, in one specific embodiment, network element interface 102 may map fields from a charging request message in CS1 to Diameter AVPs. In another specific embodiment, network element interface 102 may map fields from a charging request message in IS-826 to Diameter AVPs. Network element interface 102 may then forward the Diameter AVPs to accounting data forwarding function 104 as charging data.

Accounting data forwarding function 104 determines the occurrence of chargeable events from the charging data (i.e., a set of one or more of the collected accounting metrics) provided in the charging request messages by CTFs 112-113. In step 204, accounting data forwarding function 104 also processes the charging data to determine if offline charging or online charging is invoked for the services. There may be a variety of ways of determining if offline charging or online charging is invoked for the services. For instance, centralized charging system 101 may maintain a database of charging mechanisms for each of the users of communication network 100. Accounting data forwarding function 104 may then access the database to determine whether the user has subscribed to offline charging or online charging.

If offline charging is invoked for services, then accounting data forwarding function 104 assembles the charging data, such as from a set of one or more of the collected accounting metrics, and generates offline accounting request messages that include the charging data in step 206. In generating the offline accounting request messages, accounting data forwarding function 104 parses the charging data received for the services, and inserts the charging data in the offline accounting request messages. For example, in one embodiment, accounting data forwarding function 104 receives Diameter AVPs from network element interface 102, and assembles the Diameter AVPs into a Diameter Rf message for offline charging.

In step 208, charging system interface 106 transmits the offline accounting request messages to offline charging system 120 in the appropriate protocol. For instance, charging system interface 106 may format and transmit the offline accounting request messages according to Diameter Rf protocol, such as by transmitting an Accounting Request (ACR) message. In FIG. 1, CDF 122 receives the offline accounting request messages from charging system interface 106 and processes the messages accordingly. CDF 122 also responds with offline accounting response messages to centralized charging system 101.

In FIG. 2, charging system interface 106 receives the offline accounting response messages from offline charging system 120 in step 210. Accounting data forwarding function 104 generates service authorization messages in step 212. With offline charging, prior authorization from offline charging system 120 is not needed to authorize the services, so step 212 may be performed at any time. Network element interface 102 converts the service authorization messages in the common protocol used by accounting data forwarding function 104 to charging response messages in the protocols used by the network elements 110-111. For example, in one embodiment, network element interface 102 maps Diameter AVPs to fields in the specific charging response messages supported by network elements 110-111. Network element interface 102 then transmits the charging response messages to the CTFs 112-113 in step 214. Again, responsive to the charging response messages, the network elements 110-111 identify that the services have been authorized, and provide the appropriate service.

In FIG. 2, if online charging is invoked for services, then accounting data forwarding function 104 generates online accounting request messages that include the charging data in step 216. In generating the online accounting request messages, accounting data forwarding function 104 parses the charging data received for the services, and inserts the charging data in the online accounting request messages. For example, in one embodiment, accounting data forwarding function 104 receives Diameter AVPs from network element interface 102, and assembles the Diameter AVPs into a Diameter Ro message for online charging.

In step 218, charging system interface 106 transmits the online accounting request messages to online charging system 130 in the appropriate protocol. For instance, charging system interface 106 may format and transmit the online accounting request messages according to Diameter Ro protocol, such as by transmitting a Credit Control Request (CCR) message. Online charging system 130 receives the online accounting request messages from charging system interface 106 and processes the messages accordingly. For instance, OCF 132 processes the online accounting request message to identify information for the service being provided, such as the identity of the user, the type of service, etc. OCF 132 then accesses RF 136 with the service information to determine a rating for the service. OCF 132 also accesses ABMF 134 to determine whether the user has a sufficient account balance for the service, and if so, to determine how many service units to grant for the service. OCF 132 then grants a quota of service units from the account of the user based on the rating, the account balance, etc. OCS 130 then generates a charging response message that includes the granted quota of service units.

In step 220, charging system interface 106 receives the online accounting response messages from online charging system 130. Accounting data forwarding function 104 then determines whether the online accounting response messages include a granted quota of service units in step 221. For the messages that include quotas, accounting data forwarding function 104 determines that the services have been authorized. Accounting data forwarding function 104 then generates service authorization messages in step 222. For the messages that do not include quotas, accounting data forwarding function 104 determines that the services have not been authorized. Accounting data forwarding function 104 then generates service rejection messages in step 224. In step 225, network element interface 102 converts the service authorization messages and/or the service rejection messages from the common protocol to charging response messages in the protocol used by network elements 110-111. In step 226, network element interface 102 transmits the charging response messages to the CTFs 112-113 in the network elements 110-111. Responsive to the charging response messages, the network elements 110-111 determine whether the services have been authorized or rejected, and provide the services accordingly.

Figure 3:
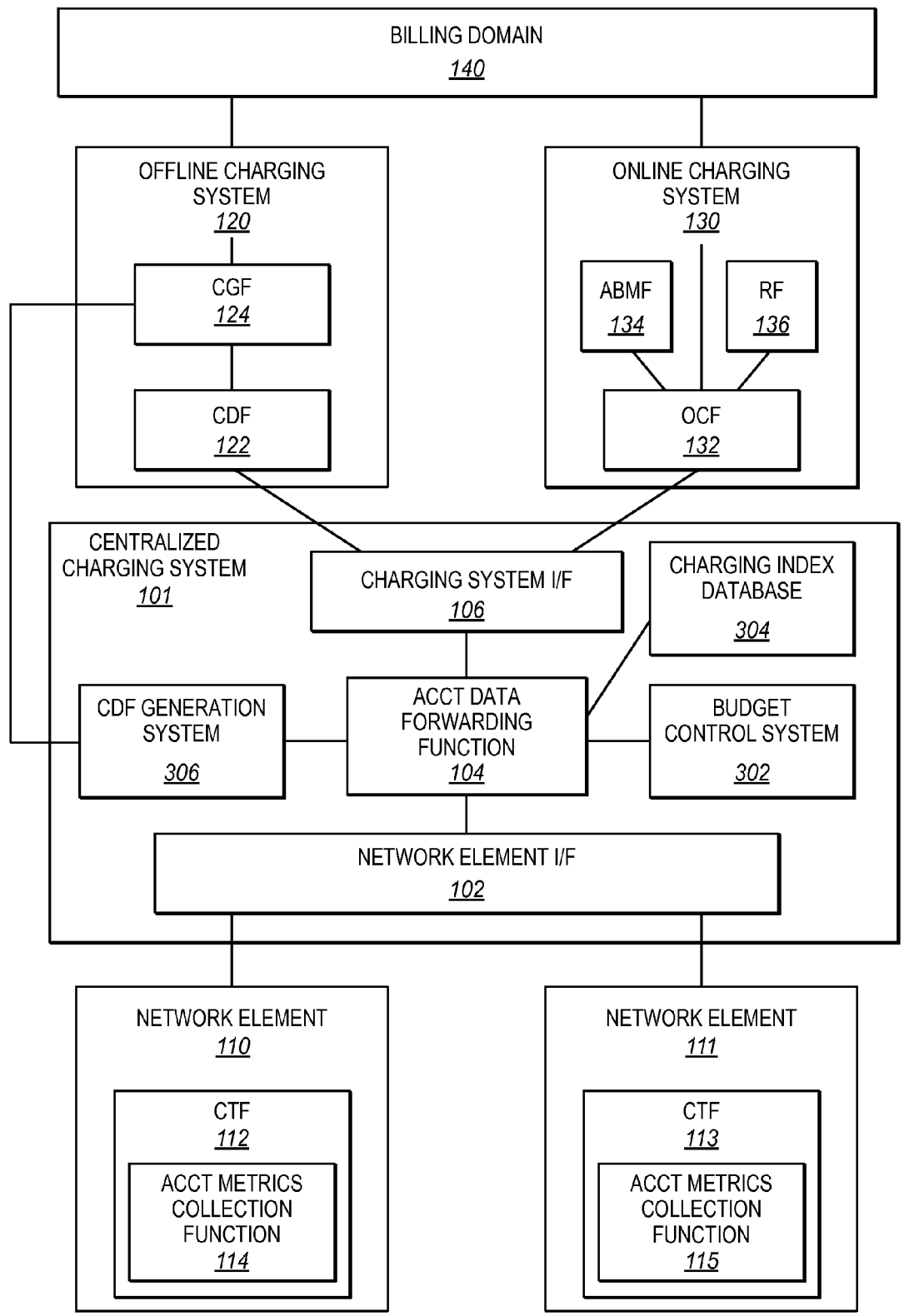
FIG. 3 illustrates a communication network with a centralized charging system including further functionality in an exemplary embodiment of the invention.

FIG. 3 illustrates communication network 100 with centralized charging system 101 including further functionality in an exemplary embodiment of the invention. In this embodiment, centralized charging system 101 may further include a budget control system 302. Budget control system 302 comprises any system, server, or function operable to provide budget control or quota supervision based on a granted quota of service units for online charging. After a quota of service units is granted by online charging system 130 and is obtained by accounting data forwarding function 104 for a particular service request, accounting data forwarding function 104 transmits the charging response message to the network element 110-111 authorizing the service. Accounting data forwarding function 104 also forwards the granted quota of service units to budget control system 302 for budget control.

Figure 4:
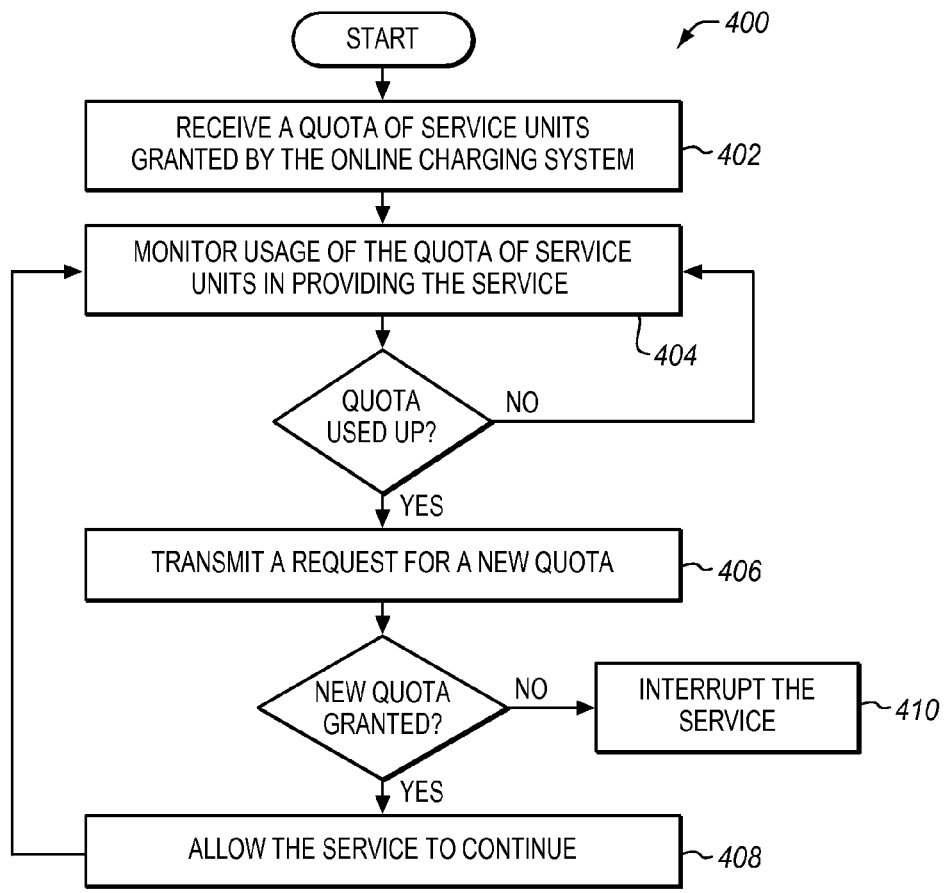
FIG. 4 is a flow chart illustrating a method of performing budget control in an exemplary embodiment of the invention.

FIG. 4 is a flow chart illustrating a method 400 of performing budget control in an exemplary embodiment of the invention. Budget control system 302 receives the granted quota in step 402. The network element, assume network element 110, that receives the charging response message authorizing the service begins to provide the service (see FIG. 3). Network element 110 also transmits an indication to budget control system 302 that the service has started. Budget control system 302 then real-time monitors usage of the quota of service units in providing the service in network element 110 in step 404.

When the granted quota is used up, budget control system 302 transmits a request for a new quota of service units to accounting data forwarding function 104 in step 406. Responsive to the request, accounting data forwarding function 104 applies for another quota from online charging system 130 by generating another online accounting request message that requests a new quota. Charging system interface 106 then transmits the online accounting request message to online charging system 130. Online charging system 130 operates as described above to determine whether another quota should be granted for this service. If a new quota is granted by online charging system 130, then accounting data forwarding function 104 will receive another online accounting response message that includes the new quota. Accounting data forwarding function 104 forwards the new quota to budget control system 302. Budget control system 302 allows the service to continue in step 408, and then resumes budget control on the new quota. If no new quota is granted, then budget control system 302 interrupts the service in step 410.

When the service ends, budget control system 302 calculates the quota actually used in providing the service. Accounting data forwarding function 104 then generates an online accounting request message that includes the used quota, and charging system interface 106 transmits the online accounting request message to online charging system 130. Based on the used quota as reported by budget control system 302, online charging system 130 adjusts the account of the user accordingly.

In FIG. 3, centralized charging system 101 may further include a charging index database 304. Charging index database 304 comprises any system, server, or function operable to maintain service and user charging mechanisms for online charging and/or offline charging. Charging index database 304 stores charging profiles for the users of communication network 100. Each charging profile includes an indication of the type of charging mechanism selected by the user. Each charging profile may also include the address of the charging systems assigned to handle charging for the user. Charging index database 304 may be a standalone system, or may be integrated into another network subscriber database, such as a Home Subscriber Server (HSS).

To determine whether offline charging is invoked for a service or whether online charging is invoked, accounting data forwarding function 104 may transmit a query to charging index database 304 to determine the service charging (offline, online, or both) for a service requested for a particular user. Charging index database 304 operates as follows.

Figure 5:
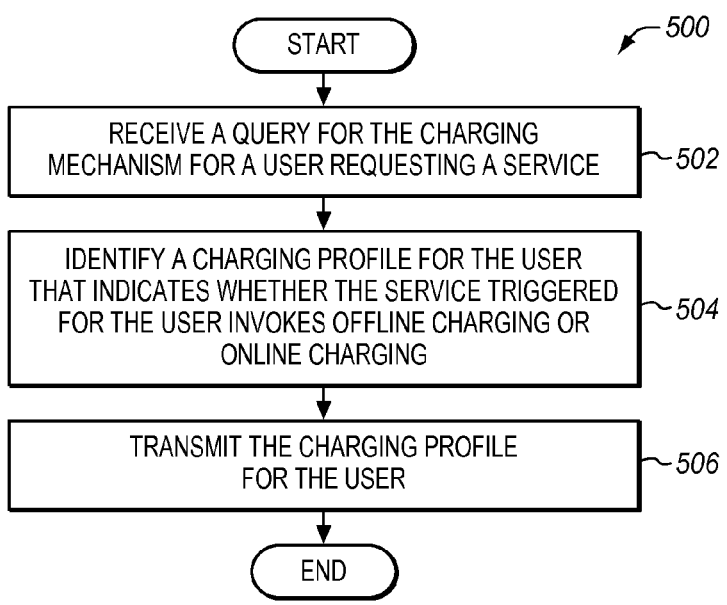
FIG. 5 is a flow chart illustrating a method of operating a charging index database in an exemplary embodiment of the invention.

FIG. 5 is a flow chart illustrating a method 500 of operating charging index database 304 in an exemplary embodiment of the invention. Charging index database 304 receives the query from accounting data forwarding function 104 in step 502. Responsive to the query, charging index database 304 identifies the charging profile for the user requesting the service, which indicates whether the service triggered for the user invokes offline charging or online charging. Charging index database 304 then transmits the charging profile to accounting data forwarding function 104.

In FIG. 3, centralized charging system 101 may further include a CDR generation system 306. CDR generation system 306 comprises any system, server, or function operable to directly generate Charging Data Records (CDR) for offline services. To generate a CDR, accounting data forwarding function 104 may transmit charging data to CDR generation system 306 for a particular service or a session. CDR generation system 306 collects the appropriate charging data, generates a CDR, and inserts the charging data in the appropriate fields of the CDR. CDR generation system 306 may keep the CDR open and update the CDR responsive to receiving further charging data from accounting data forwarding function 104. At some point, CDR generation system 306 closes the CDR, and transmits the CDR to CGF 124 for further processing.

Figure 6:
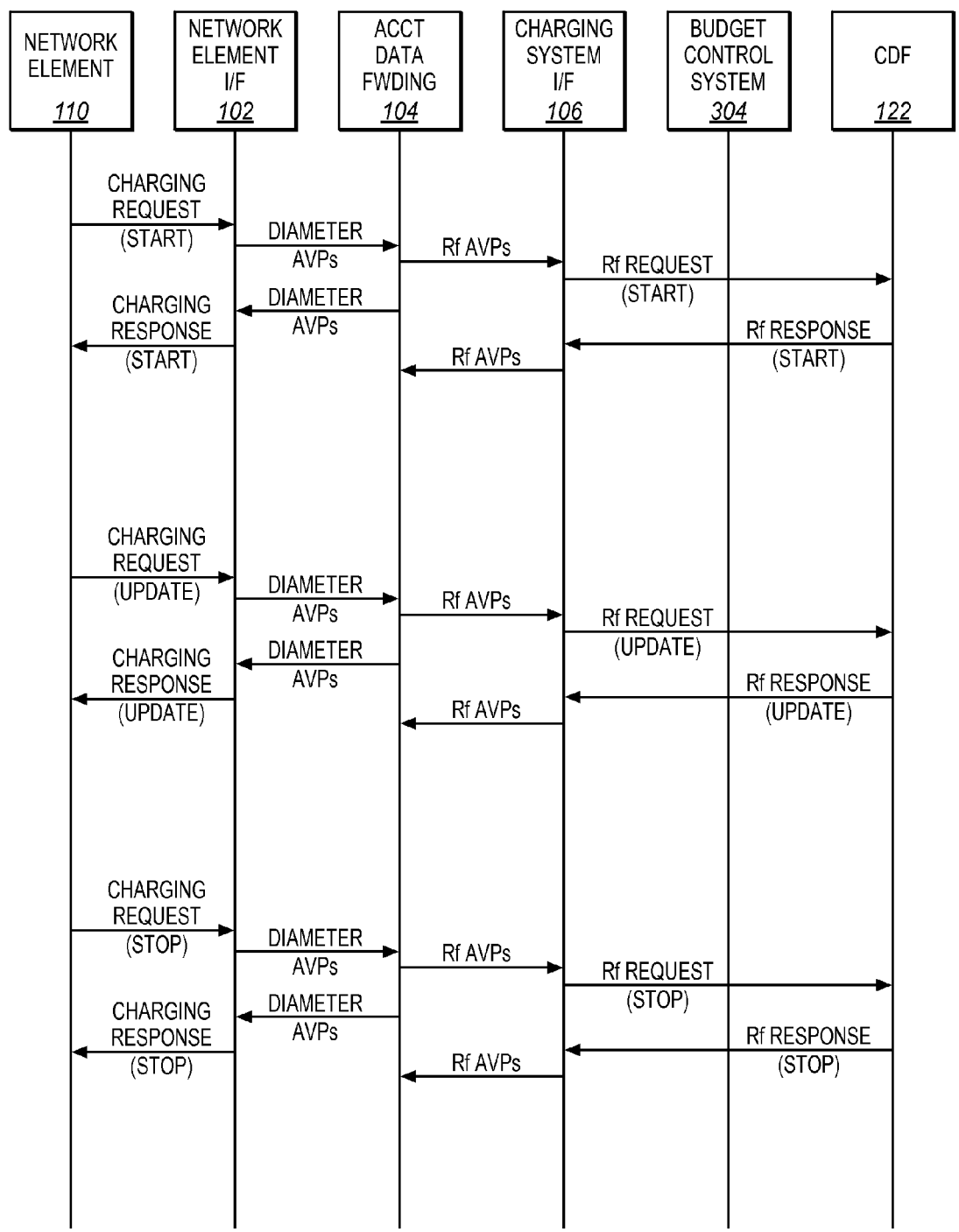
FIG. 6 is a message diagram illustrating an example of offline charging through a centralized charging system in an exemplary embodiment of the invention.

FIG. 6 is a message diagram illustrating an example of offline charging through centralized charging system 101 in an exemplary embodiment of the invention. Assume that network element 110 has been requested to provide a service for a user during a session or at initiation of a session. Responsive to the request, the CTF 112 in network element 110 will identify a charging event. CTF 112 then transmits a charging request (start) message to centralized charging system 101 indicating the start of a service. Network element interface 102 receives the charging request (start) message, and maps the charging data included in the charging request (start) message to Diameter AVPs. Network element interface 102 then forwards the Diameter AVPs to accounting data forwarding function 104.

Accounting data forwarding function 104 determines whether the requested service has invoked offline charging or online charging. Accounting data forwarding function 104 then processes the Diameter AVPs to generate an offline accounting request message (e.g., Diameter Rf ACR message) or an online accounting request message (e.g., Diameter Ro CCR message). In this embodiment, assume that offline charging has been invoked, so accounting data forwarding function 104 generates a Diameter Rf accounting request (start) message. Charging system interface 106 then transmits the Diameter Rf accounting request (start) message to CDF 122.

Because offline charging is invoked, accounting data forwarding function 104 also authorizes the service, and forwards the appropriate Diameter AVPs to network element interface 102 indicating that the service has been authorized. Network element interface 102 then maps the Diameter AVPs into a charging response (start) message in the protocol used by network element 110, and forwards the charging response (start) message to network element 110. Network element 110 then begins providing the requested service.

While providing the service, the CTF 112 in network element 110 may identify one or more charging events. A typical charging event is an update that is periodically triggered. Responsive to another charging event, CTF 112 transmits a charging request (update) message to centralized charging system 101. Network element interface 102 receives the charging request (update) message, and maps the charging data included in the charging request (update) message to Diameter AVPs. Network element interface 102 then forwards the Diameter AVPs to accounting data forwarding function 104.

Accounting data forwarding function 104 may again determine whether the requested service has invoked offline charging or online charging. In this embodiment, offline charging has been invoked, so accounting data forwarding function 104 generates a Diameter Rf accounting request (update) message. Charging system interface 106 then transmits the Diameter Rf accounting request (update) message to CDF 122. Accounting data forwarding function 104 again authorizes the service, and forwards the appropriate Diameter AVPs to network element interface 102 indicating that the service has been authorized. Network element interface 102 maps the Diameter AVPs into a charging response (update) message in the protocol used by network element 110, and forwards the charging response (update) message to network element 110. Network element 110 continues providing the requested service.

At the end of the service, the CTF 112 in network element 110 identifies yet another charging event. CTF 112 transmits a charging request (stop) message to centralized charging system 101. Network element interface 102 receives the charging request (stop) message, and maps the charging data included in the charging request (stop) message to Diameter AVPs. Network element interface 102 forwards the Diameter AVPs to accounting data forwarding function 104. Accounting data forwarding function 104 generates a Diameter Rf accounting request (stop) message, and charging system interface 106 transmits the Diameter Rf accounting request (stop) message to CDF 122. Accounting data forwarding function 104 acknowledges the end of the service, and forwards the appropriate Diameter AVPs to network element interface 102. Network element interface 102 maps the Diameter AVPs into a charging response (stop) message in the protocol used by network element 110, and forwards the charging response (stop) message to network element 110.

Figure 7:
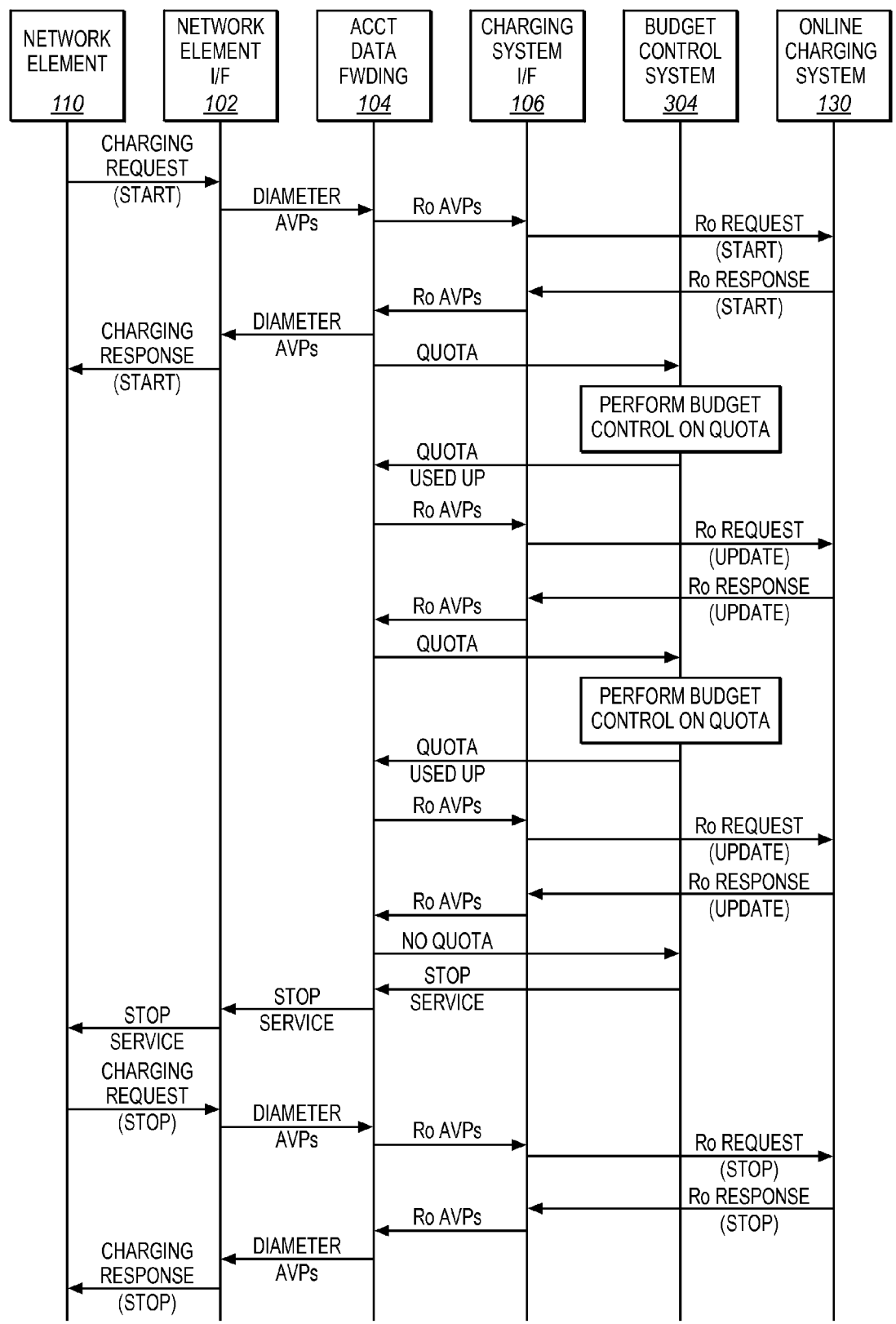
FIG. 7 is a message diagram illustrating an example of online charging through a centralized charging system in an exemplary embodiment of the invention.

FIG. 7 is a message diagram illustrating an example of online charging through centralized charging system 101 in an exemplary embodiment of the invention. Assume again that network element 110 has been requested to provide a service for a user during a session or at initiation of a session. Responsive to the request, the CTF 112 in network element 110 will identify a charging event. CTF 112 then transmits a charging request (start) message to centralized charging system 101 indicating the start of a service. Network element interface 102 receives the charging request (start) message, and maps the charging data included in the charging request (start) message to Diameter AVPs. Network element interface 102 then forwards the Diameter AVPs to accounting data forwarding function 104.

Accounting data forwarding function 104 determines whether the requested service has invoked offline charging or online charging. In this embodiment online charging has been invoked, so accounting data forwarding function 104 processes the Diameter AVPs to assemble the charging data for the service, and to generate a Diameter Ro accounting request (start) message that includes the assembled charging data. Charging system interface 106 then transmits the Diameter Ro accounting request (start) message to online charging system 130. Because online charging is invoked, accounting data forwarding function 104 needs permission from online charging system 130 to authorize the service. Accounting data forwarding function 104 thus waits for a quota from online charging system 130.

Online charging system 130 receives the Diameter Ro accounting request (start) message that includes the charging data, and grants a quota of service units. Online charging system 130 then transmits a Diameter Ro accounting response (start) message to centralized charging system 101. Charging system interface 106 receives the Diameter Ro accounting response (start) message, and forwards the message to accounting data forwarding function 104. Accounting data forwarding function 104 processes the message to determine if a quota was granted. If so, accounting data forwarding function 104 authorizes the service, and forwards the appropriate Diameter AVPs to network element interface 102 indicating that the service has been authorized. Network element interface 102 maps the Diameter AVPs into a charging response (start) message in the protocol used by network element 110, and forwards the charging response (start) message to network element 110. Network element 110 begins providing the requested service.

Accounting data forwarding function 104 also forwards the quota of service units to budget control system 304. Responsive to receiving the quota, budget control system 304 waits for an indication from network element 110 that the service has begun. Budget control system 304 then monitors usage of the quota while the service is being provided.

When the granted quota is used up, budget control system 302 transmits a request for a new quota of service units to accounting data forwarding function 104. Responsive to the request, accounting data forwarding function 104 applies for another quota from online charging system 130 by generating a Diameter Ro accounting request (update) message. Charging system interface 106 transmits the Diameter Ro accounting request (update) message to online charging system 130. Online charging system 130 receives the Diameter Ro accounting request (update) message and grants a new quota of service units. Online charging system 130 then transmits a Diameter Ro accounting response (update) message to centralized charging system 101. Charging system interface 106 receives the Diameter Ro accounting response (update) message, and forwards the message to accounting data forwarding function 104. Accounting data forwarding function 104 processes the message to determine if a new quota was granted. If so, then accounting data forwarding function 104 forwards the new quota of service units to budget control system 304. Responsive to receiving the new quota, budget control system 304 monitors usage of the new quota while the service is being provided.

When the granted quota is again used up, budget control system 302 transmits a request for a new quota of service units to accounting data forwarding function 104. Responsive to the request, accounting data forwarding function 104 applies for another quota from online charging system 130. Assume this time that online charging system 130 does not grant a new quota, such as if the account balance of the user is at zero units. Online charging system 130 then transmits a Diameter Ro accounting response (update) message to centralized charging system 101. Charging system interface 106 receives the Diameter Ro accounting response (update) message, and forwards the message to accounting data forwarding function 104. Accounting data forwarding function 104 processes the message to determine if a new quota was granted. Because no quota was granted, accounting data forwarding function 104 forwards an indication that no quota was granted to budget control system 304. Budget control system 304 then responds with a message to stop the service. Accounting data forwarding function 104 forwards a message to network element interface 102 indicating that the service should be stopped. Network element interface 102 forwards the message to network element 110, and network element 110 stops service.

Responsive to the service being stopped, the CTF 112 in network element 110 identifies yet another charging event. CTF 112 then transmits a charging request (stop) message to centralized charging system 101. Network element interface 102 receives the charging request (stop) message, and maps the charging data included in the charging request (stop) message to Diameter AVPs. Network element interface 102 forwards the Diameter AVPs to accounting data forwarding function 104. Accounting data forwarding function 104 generates a Diameter Ro accounting request (stop) message, and charging system interface 106 transmits the Diameter Ro accounting request (stop) message to online charging system 130 responsive to which online charging system 130 returns Diameter Ro accounting response (stop) message. Accounting data forwarding function 104 acknowledges the end of the service, and forwards the appropriate Diameter AVPs to network element interface 102. Network element interface 102 then maps the Diameter AVPs into a charging response (stop) message in the protocol used by network element 110, and forwards the charging response (stop) message to network element 110.

Although specific embodiments were described herein, the scope of the invention is not limited to those specific embodiments. The scope of the invention is defined by the following claims and any equivalents thereof.

We claim:
1. An apparatus comprising:
   a centralized charging system including a processor that is implemented between a plurality of network elements and an offline charging system and implemented between the network elements and an online charging system, the centralized charging system comprising:
      a network element interface operable to receive charging request messages from the network elements that include charging data for services triggered in the network elements, and to convert the charging request messages from protocols used by the network elements into a common protocol;
      an accounting data forwarding function operable to process the charging data in the charging request messages of the common protocol to determine if offline charging or online charging is invoked for the services, to generate offline accounting request messages that include the charging data for the services that invoke offline charging, and to generate online accounting request messages that include the charging data for the services that invoke online charging; and a charging system interface operable to transmit the offline accounting request messages to the offline charging system, and to transmit the online accounting request messages to the online charging system.

2. The apparatus of claim 1 wherein if the charging request messages include charging data for services invoking offline charging, then:
the accounting data forwarding function is further operable to generate service authorization messages in the common protocol; and
the network element interface is further operable to convert the service authorization messages into charging response messages in the protocols used by the network elements, and to transmit the charging response messages to the network elements that triggered the services.

3. The apparatus of claim 1 wherein if the charging request messages include charging data for services invoking online charging, then:
the accounting data forwarding function is further operable to wait to receive online accounting response messages from the online charging system;
responsive to receiving the online accounting response messages, the accounting data forwarding function is further operable to process the online accounting response messages to determine if quotas of service units have been granted by the online charging system for the services, to generate service authorization messages responsive to the online accounting response messages including the granted quotas, and to generate service rejection messages responsive to the online accounting response messages not including the granted quotas; and
the network element interface is further operable to convert the service authorization messages and the service rejection messages from the common protocol to charging response messages in the protocol used by the network elements, and to transmit the charging response messages to the network elements that triggered the services.

4. The apparatus of claim 3 further comprising:
a budget control system operable to receive the quotas of service units granted by the online charging system, and to monitor usage of the quotas of service units in providing the services in the network elements.

5. The apparatus of claim 4 wherein:
the budget control system is further operable to transmit requests for new quotas to the accounting data forwarding function if the granted quotas of service units expire;
the accounting data forwarding function is further operable to generate other online accounting request messages that request new quotas for the services responsive to the request from the budget control system; and
the charging system interface is further operable to transmit the other online accounting request messages to the online charging system.

6. The apparatus of claim 1 further comprising:
a charging index database operable to store charging profiles, to receive a query from the accounting data forwarding function for a charging profile of a user having requested a service, to identify the charging profile for the user indicating whether the service triggered for the user invokes offline charging or online charging, and to transmit the charging profile to the accounting data forwarding function.

7. The apparatus of claim 1 further comprising:
a CDR generation system operable to generate Charging Data Records (CDR) based on charging data for the services invoking offline charging.

8. The apparatus of claim 1 wherein:
the offline accounting request messages comprise Diameter Rf messages; and
the online accounting request messages comprise Diameter Ro messages.

9. A method of operating a centralized charging system that is implemented in a communication network between a plurality of network elements and an offline charging system and implemented between the network elements and an online charging system, the method comprising:
receiving charging request messages in the centralized charging system from the network elements that include charging data for services triggered in the network elements;
converting the charging request messages from protocols used by the network elements into a common protocol;
processing the charging data in the charging request messages of the common protocol to determine if offline charging or online charging is invoked for the services;
generating offline accounting request messages that include the charging data for the services that invoke offline charging, and transmitting the offline accounting request messages from the centralized charging system to the offline charging system; and
generating online accounting request messages that include the charging data for the services that invoke online charging, and transmitting the online accounting request messages from the centralized charging system to the online charging system.

10. The method of claim 9 wherein if the charging request messages include charging data for services invoking offline charging, then the method further comprises:
generating service authorization messages in the common protocol;
converting the service authorization messages into charging response messages in the protocols used by the network elements; and
transmitting the charging response messages from the centralized charging system to the network elements that triggered the services.

11. The method of claim 9 wherein if the charging request messages include charging data for services invoking online charging, then the method further comprises:
waiting to receive online accounting response messages in the centralized charging system from the online charging system;
responsive to receiving the online accounting response messages, processing the online accounting response messages to determine if quotas of service units have been granted by the online charging system for the services;
generating service authorization messages responsive to the online accounting response messages including the granted quotas;
generating service rejection messages responsive to the online accounting response messages not including the granted quotas;

converting the service authorization messages and the service rejection messages from the common protocol to charging response messages in the protocol used by the network elements; and transmitting the charging response messages from the centralized charging system to the network elements that triggered the services.

12. The method of claim 11 further comprising:

receiving the quotas of service units granted by the online charging system in the centralized charging system; and monitoring usage of the quotas of service units in providing the services in the network elements.

13. The method of claim 12 further comprising:

if the granted quotas of service units expire, then generating other online accounting request messages that request new quotas for the services; and transmitting the other online accounting request messages from the centralized charging system to the online charging system.

14. The method of claim 9 further comprising:

storing charging profiles;

receiving a query for a charging profile of a user having requested a service; and identifying the charging profile for the user indicating whether the service triggered for the user invokes offline charging or online charging.

15. The method of claim 9 further comprising:

generating Charging Data Records (CDR) based on charging data for the services invoking offline charging.

16. The method of claim 9 wherein:

the offline accounting request messages comprise Diameter Rf messages; and the online accounting request messages comprise Diameter Ro messages.

17. An apparatus comprising:

a centralized charging system that is implemented between a plurality of network elements and an offline charging system and implemented between the network elements and an online charging system, the centralized charging system comprising:

a network element interface operable to receive charging request messages from Charging Trigger Functions (CTF) in the network elements, wherein the charging request messages include charging data for services triggered in the network elements, and to convert the charging request messages into Diameters AVPs;

an accounting data forwarding function operable to process the Diameter AVPs to determine if offline charging or online charging is invoked for the services, to assemble the charging data for the services, to generate Diameter Rf request messages that include the assembled charging data for the services that invoke offline charging, and to generate Diameter Ro request messages that include the assembled charging data for the services that invoke online charging; and a charging system interface operable to transmit the Diameter Rf request messages to the offline charging system, and to transmit the Diameter Ro request messages to the online charging system.

18. The apparatus of claim 17 wherein if charging request messages include charging data for services invoking online charging, then:

the accounting data forwarding function is further operable to wait to receive Diameter Ro response messages from the online charging system;

responsive to receiving the Diameter Ro response messages, the accounting data forwarding function is further operable to process the Diameter Ro response messages to determine if quotas of service units have been granted by the online charging system for the services, to generate Diameter AVPs that authorize the service responsive to the Diameter Ro response messages including the granted quotas, and to generate Diameter AVPs that reject the services responsive to the Diameter Ro response messages not including the granted quotas; and the network element interface is further operable to convert the Diameter AVPs to charging response messages in protocols used by the network elements, and to transmit the charging response messages to the CTFs in the network elements that triggered the services.

19. The apparatus of claim 18 further comprising:

a budget control system in the centralized charging system operable to receive the quotas of service units granted by the online charging system, and to monitor usage of the quotas of service units in providing the services in the network elements.

20. The apparatus of claim 17 further comprising:

a charging index database in the centralized charging system operable to store charging profiles, to receive a query from the accounting data forwarding function for a charging profile of a user having requested a service, to identify the charging profile for the user indicating whether the service triggered for the user invokes offline charging or online charging, and to transmit the charging profile to the accounting data forwarding function.

* * * * *